US007605517B2

(12) United States Patent
Enomoto et al.

(10) Patent No.: US 7,605,517 B2
(45) Date of Patent: Oct. 20, 2009

(54) CLAW POLE ROTATING ELECTRIC MACHINE

(75) Inventors: Yuji Enomoto, Hitachi (JP); Motoya Ito, Hitachinaka (JP); Shoji Ohiwa, Saitama (JP); Ryozo Masaki, Hitachi (JP); Chio Ishihara, Tokyo (JP)

(73) Assignees: Hitachi Industrial Equipment Systems Co., Ltd., Tokyo (JP); Hitachi Powered Metals Co., Ltd., Chiba (JP); Japan Servo Co., Ltd., Tokyo (JP)

( * ) Notice: Subject to any disclaimer, the term of this patent is extended or adjusted under 35 U.S.C. 154(b) by 284 days.

(21) Appl. No.: 11/527,410

(22) Filed: Sep. 27, 2006

(65) Prior Publication Data
US 2007/0075605 A1 Apr. 5, 2007

(30) Foreign Application Priority Data
Sep. 30, 2005 (JP) ............................. 2005-286634
Sep. 5, 2006 (JP) ............................. 2006-239694

(51) Int. Cl.
*H02K 1/12* (2006.01)
(52) U.S. Cl. ..................................... 310/257; 310/49 R
(58) Field of Classification Search ................... 310/43, 310/44, 49 R, 257
See application file for complete search history.

(56) References Cited
U.S. PATENT DOCUMENTS
5,962,947 A * 10/1999 Suzuki et al. ............... 310/257
5,986,379 A * 11/1999 Hollenbeck et al. ......... 310/257
6,031,304 A * 2/2000 Suzuki et al. ............. 310/49 R
7,135,802 B2 11/2006 Seki et al.
2005/0012427 A1 1/2005 Seki et al.

FOREIGN PATENT DOCUMENTS
JP 2004-068041 3/2004

\* cited by examiner

*Primary Examiner*—Dang D Le
(74) *Attorney, Agent, or Firm*—Antonelli, Terry, Stout & Kraus, LLP.

(57) ABSTRACT

A claw pole type rotating electric machine includes first and second claw cores which are disposed on a ring shaped ring yoke portion and a plurality of claw magnetic poles which extend in the axial direction are provided, and stator cores are formed by meshing of the claw magnetic poles with each other, and the stator is formed by holding the ring coils on the outer circumference side of the claw magnetic poles, wherein the first and second claw cores are formed by powder cores, the radial direction thickness of the claw magnetic pole is 2 mm or more, a flat surface is formed perpendicular to the axial direction at the end extending in the axial direction of the claw magnetic pole, a ejection taper in the circumference direction of the claw magnetic pole is formed in the range of 10 degrees or less, and the ratio of the axial direction length of the claw magnetic pole and the axial direction thickness of the ring yoke portion is no more than 5:1.

7 Claims, 9 Drawing Sheets

COMPARISON OF BH PROPERTIES FOR
EACH MAGNETIC MATERIAL   H (A/m)

COMPARISON OF BH PROPERTIES FOR
EACH MAGNETIC MATERIAL  H (A/m)

CLAW POLE ROTATING ELECTRIC MACHINE

CLAIM OF PRIORITY

The present application claims priority from Japanese application Ser. No. 2005-286634, filed on Sep. 30, 2005 and Japanese application Ser. No. 2006-239694, filed on Sep. 5, 2006, the content of which are hereby incorporated by reference into this application.

BACKGROUND OF THE INVENTION

1. Field of the Invention

This invention relates to a claw pole type rotating electric machine which has a claw type magnetic pole.

2. Description of the Prior Art

In the typical rotating electric machine, much attention has been given to claw pole type rotating electric machines equipped with a stator core which has a claw type magnetic pole, in order to increase the space factor of the winding and improve utilization of magnetic flux.

In addition, in the claw pole type rotating electric machine of the prior art, in order to form the plurality of claw magnetic poles of the stator core, as is the case in Japanese Patent Laid-Open No. 2004-68041 for example, magnetic poles may be formed by compacting of the soft magnetic powder.

SUMMARY OF THE INVENTION

According to the technology of the prior art in which the claw magnetic pole is formed by compacting of soft magnetic powder, there is the advantage that the claw magnetic pole can be formed in a 3-D shape, but generally there is a problem in that, the claw magnetic poles formed by compacting of these magnetic powders have inferior magnetic properties when compared to the claw magnetic pole motor formed using a cold-rolled steel plate.

The object of this invention is to provide a claw pole type rotating electric machine in which even when the claw magnetic pole is formed by compacting of magnetic powder, magnetic properties which are greater than that of the claw magnetic pole of the cold-rolled steel plate can be obtained.

Means for Solving the Problems

In order to achieve this object, there is a claw pole type rotating electric machine comprising a ring yoke portion and first and second claw cores which are formed of a plurality of claw magnetic poles which are disposed at equal intervals on the circumference of the inner diameter side of the ring yoke portion and extend in the axial direction, and a stator core formed by meshing of the claw magnetic poles of the first and second claw cores with each other, and a stator formed by holding the ring coil on the outer circumference side of the claw magnetic poles in which the stator cores have been meshed, and a rotor positioned via a space in the circumferential direction at the inner diameter side of the stator wherein, the first and second claw cores are formed by compacting of magnetic powder and the radial direction thickness of the claw magnetic pole is 2 mm or more and a flat surface is formed perpendicular to the axial direction at the end extending in the axial direction of the claw magnetic pole, and at the claw magnetic pole, a ejection taper in the range of 10 degrees or less with respect to the axial direction is formed as a taper from the base to the end extending in the axial direction, and the ratio of the axial direction length of the claw magnetic pole and the axial direction thickness of the ring yoke portion is no more than 5:1.

In this manner, because the thickness of the claw magnetic pole is 2 mm or more, and the flat surface is formed perpendicular to the axial direction at the axial direction free end of the claw magnetic pole, and the axial direction width angle of the claw magnetic pole is formed as a taper from the base to the axial direction free end is no more than 10 degrees, and the ratio of the axial direction length of the claw magnetic pole and the axial direction thickness of the ring yoke portion is no more than 5:1, the magnetic powder can be subjected to compacting at high pressure, and consequently the density of the magnetic powder can be increased, and so the magnetic properties can be improved so as to be greater than the claw magnetic pole formed using a cold-rolled steel plate.

As described above, according to this invention, even for a claw magnetic pole that is formed by compacting of magnetic powder, a claw pole type rotating electric machine that has magnetic properties greater than that of the claw magnetic pole made by the cold-rolled steel plate can be obtained.

DESCRIPTION OF THE PREFERRED EMBODIMENTS

Figure 1:
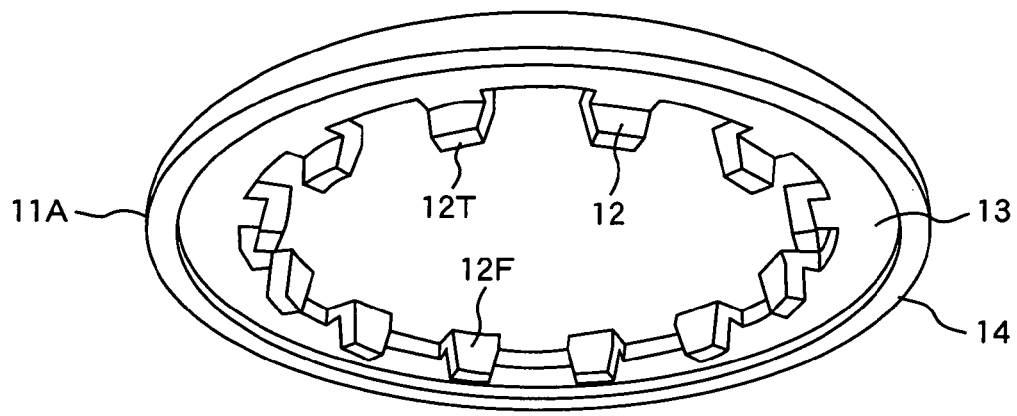
FIG. 1 is a perspective view showing the first claw core 11A and the second claw core 11B which comprise the stator core of the claw pole type rotating electric machine according to this invention.
Figure 2:
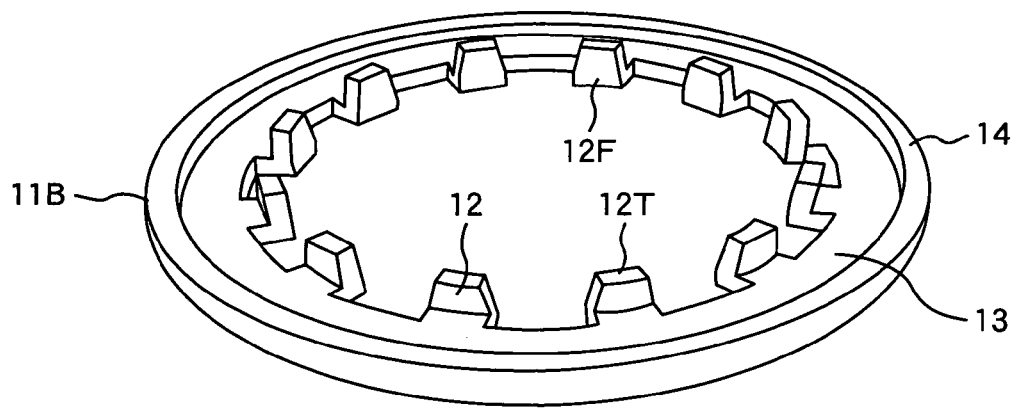
FIG. 2 is a cross-sectional view of first claw core or the second claw core of FIG. 1.
Figure 2:
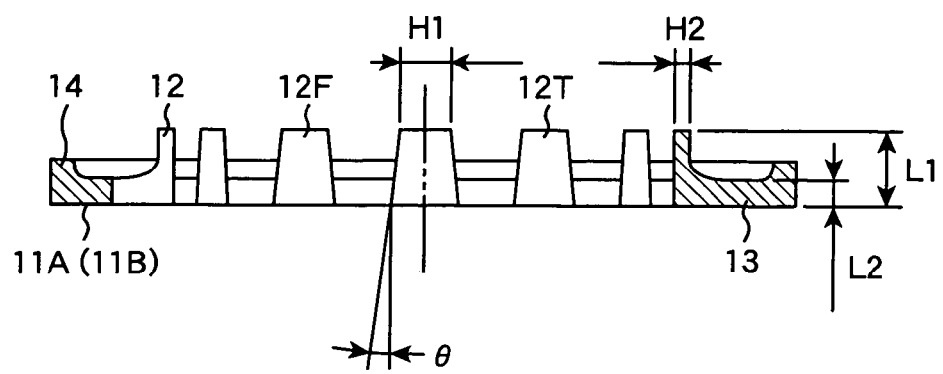
Figure 3:
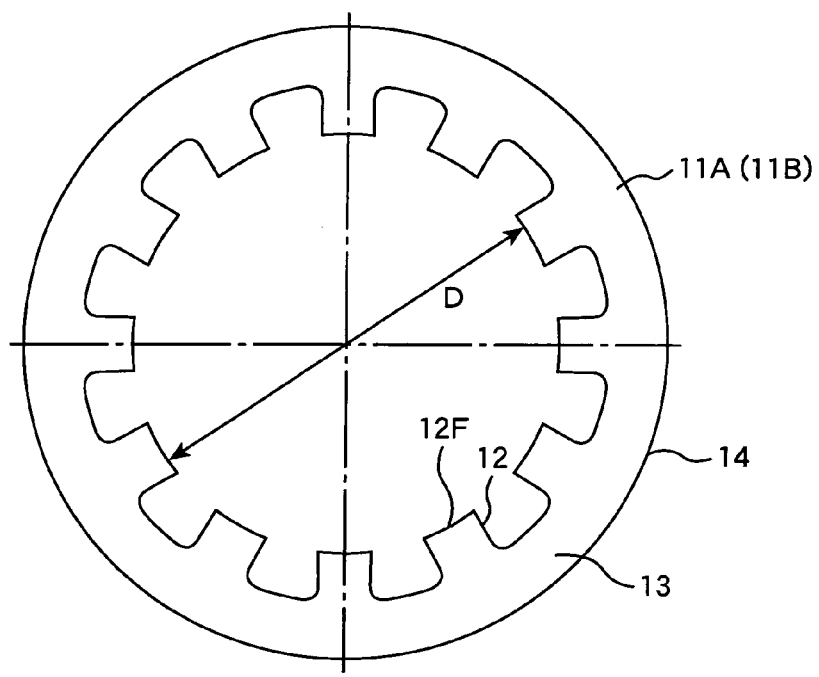
FIG. 3 is a back view of first claw core or the second claw core of FIG. 1.

One embodiment of the claw pole type rotating electric machine according to this invention is described based on the 24-pole claw pole type motor shown in FIG. 1-FIG. 5.

The claw pole type motor 1 is formed of a rotor 3 that is formed on the rotating axle 2, a stator 6 that is provided coaxially via a minute space G in the circumference direction with respect to the rotor 3, a stator frame 8 which supports the stator 6, and bearings 9A and 9B that support the rotating axle 2 so as to be rotatable at both end sides of the stator frame 8.

The rotor 3 comprises a rotor core 4 that is formed coaxially with the rotating axle 2, and permanent magnetic pole 5 that are disposed in multiples in the circumferential direction set at the outer circumference, and the stator 6 is formed of stator cores 7U, 7V and 7W and the ring coil 10 that winds onto these stator cores 7U, 7V and 7W. In addition, the stator cores 7U, 7V and 7W are supported by the stator frame 8 and the rotating shaft 2 is supported onto both end portions of the stator frame 8 so as to be rotatable via the bearing 9A and 9B.

The stator cores 7U, 7V and 7W are formed from a first claw core 11A, and a second claw core 11B and the first claw core 11A, and the second claw core respectively and is formed of a claw magnetic pole 12 that has a magnetic pole surface 12F which face the rotor 3 with a minute space G and extends in the axial direction, a ring yoke portion 13 which extends at right angles from the claw magnetic pole 12 to the outer diameter side, and an outer circumference side yoke 14 which extends in the same direction as the claw magnetic pole 12 from the ring yoke portion 13. These magnetic poles 12 respectively form 12 poles at equal intervals in the circumferential direction.

In addition, these first and second claw cores 11A and 11B are formed in the same shape by compacting of magnetic powder by punch of a die, and a more complex magnetic pole structure can be obtained when compared to that configured by layering silicon steel plates.

In this manner, first claw core 11A and the second claw core 11B that are formed by compacting of magnetic powder are disposed such that ends extending in the axial direction 12T of the magnetic pole 12 are toward each other, and by meshing the end extending in the axial direction 12T is positioned between the matching side end extending in the axial direction 12T, a plurality of magnetic pole surfaces 12F which are concentric with the rotor 3 are formed along circumference surface of the rotor 3. At the same time, by the first claw core 11A and the second claw core 11B of each of the stator cores 7U, 7V and 7W and the axial end extending in the axial direction 12T meshing with each other, each ring coil 10U, 10V and 10W are held by the first claw core 11A and the second claw core 11B respectively, and the stator 6 is formed by these.

In this manner, the stator cores 7U, 7V and 7W which have ring coils 10U, 10V and low built-in are connected in the axial direction, and by offsetting the electrical angle by 120 degrees in the circumferential direction, a 3-phase claw pole type motor is configured.

In addition, by molding these 3 serial stator cores 7U, 7V and 7W from an insulating resin, a stator 6 can be obtained in which the first claw core 11A and the second claw core 11B and the ring coil 10U, 10V and 10W are integral.

As described above, by forming the first claw core 11A and the second claw core 11B by compacting of magnetic powder, a magnetic pole structure which is complex, or in other words, one obtaining improved motor efficiency can be obtained.

It is to be noted that, when the first claw core 11A and the second claw core 11B are formed by compacting of magnetic powder, the magnetic powder is compacted using a die, but the direction of compacting is the axial direction in which the claw magnetic pole 12 extends. At this time, the punch for compacting of the first claw core 11A and the second claw core 11B must have punch cross-sectional area proportional to the axial direction dimensions of the compact such that buckling of the punch does not occur. In other words, the punch cross-sectional area must be determined based on the axial direction dimension L1 of the claw magnetic pole 12 at which the dimension in the axial direction is maximum on the first claw core 11A and the second claw core 11B. Thus, the end extending in the axial direction 12T of the claw magnetic pole 12 must have a flat surface which crosses the axial direction, and the surface area of that flat surface must be made proportionately large since the axial dimension L1 of the claw magnetic pole 12 is made large. Normally, in order to compact the magnetic powder and improve magnetic properties, about 10 ton/cm$^2$ of compacting pressure is needed, and a surface area corresponding to that is needed at the end extending in the axial direction 12T of the claw magnetic pole 12. For this reason, the radial direction thickness H2 in the end extending in the axial direction 12T of the claw magnetic pole 12 is at least 2 mm or more and the surface area of the flat surface must be secured.

Furthermore, when the compact is removed from the die, a ejection taper θ is necessary in the axial direction, and must be formed on the claw magnetic pole 12 to taper from the base to the end extending in the axial direction 12T in the range of 8-10 degrees with respect to the axial direction. In this type, at the time of compacting of the magnetic powder, a ejection taper 8 degrees or more is preferable when removing the compact from the die, but when it is as large as possible, the ejection operation is easier. However, when the ejection taper θ is made large, the surface area of the magnetic pole surface 12F of the magnetic pole 12 is reduced and magnetic properties decrease, so the ejection taper θ is preferably 10 degrees or less which is small and for which there is little effect on magnetic properties.

Furthermore, the design is generally one where the gap magnetic pole density between the rotor and the stator is 0.7-0.8 T. At this time, if the surface area of the claw is 5, the amount of the magnetic flux for one pole which flows into the claw is φ=BA and 3.5-4.0. In order for the magnetic flux to be absorbed by the yoke having thickness 1 (in the case where the ratio of axial direction length of the claw and the thickness of the yoke is 5:1), the magnetic flux density at the time when entered into the yoke cross-sectional surface area 2 (thickness 1×2 times; it is doubled here because the width of the yoke for one pair of poles is double the width of the claw for one pole) is B=φ/A and is 1.75-2.0 T, and cannot exceed 5:1 because this will be the saturation magnetic flux density limit of the iron.

As described above, according to this embodiment, by forming the first claw core 11A and the second claw core 11B as described above, the magnetic powder can be subjected to compacting at high compacting pressure and thus the density of powder core can be increased to 7.5 g/cm$^3$ or more, and as a result motor properties higher than magnetic cores by cold-rolled steel plate (SPCC: a standard code of Japanese Industrial Standard) can be obtained.

Figure 6:
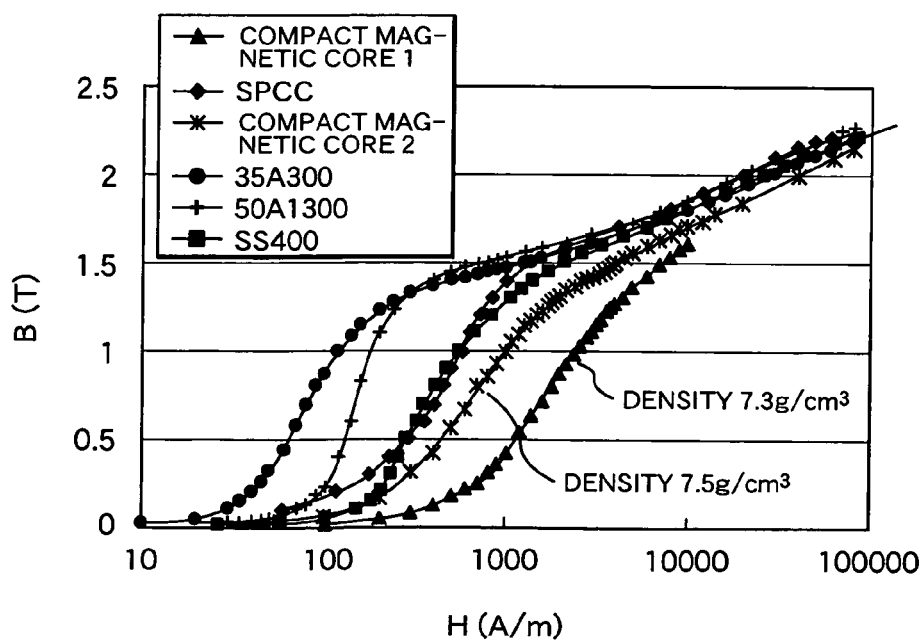
FIG. 6 is a chart showing a comparison of the magnetizing properties of the magnetic cores using various materials.

This is also evident from the comparison of the magnetic properties of the magnetic cores from each material shown in FIG. 6. In FIG. 6, when the magnetic properties of the compacted powder magnetic core 1 formed by compacting of magnetic powder and a magnetic core from cold-rolled steel plate (SPCC) and a magnetic core from a silicon steel plate (35A300, 50A1300) are looked at, the powder core 1 has small maximum magnetic flux density B (T) overall when compared with SPCC.

However, it was determined that because the first claw core 11A and the second claw core 11B of this embodiment have the aforementioned configuration conditions, high density of magnetic powder is achieved and powder core having density of 7.5 g/cm$^3$ can be obtained and they have magnetic properties (magnetic flux density) closer to SPCC and SS400 compared to powder core having density of 7.3 g/cm$^3$.

However, in the case where the powder core 1 which has a low density has extremely low magnetic flux density and is used as a motor, the magnetic properties are reduced and the magnetic pole density is also low and thus in the case where a magnet whose residual magnetic flux density is high is used as the field magnet, output torque is reduced by saturation of the magnetic flux density and the like, and it can be expected that the magnetic properties will reduce.

Figure 10:
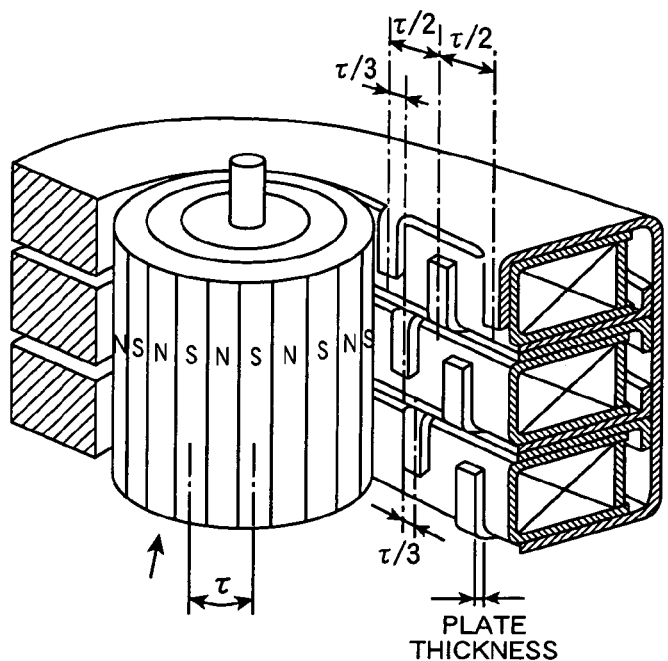
FIG. 10 is an example of the structure of the claw pole type motor that is formed cold-rolled steel plate (SPCC) of the prior art.
Figure 11:
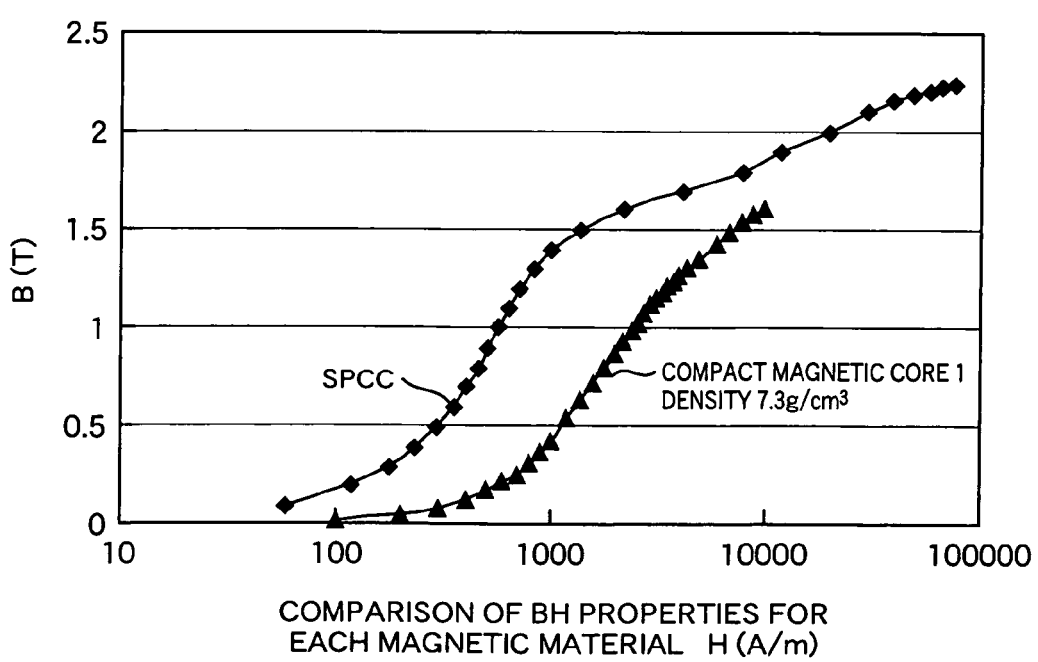
FIG. 11 is an example of comparison of the direct flow magnetic properties of SPCC and powder core.
Figure 12:
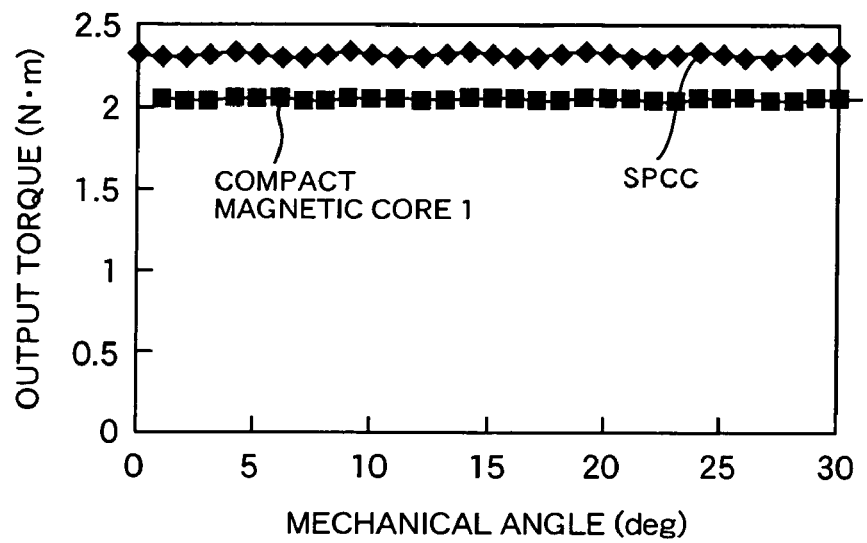
FIG. 12 is an example of the results of comparison of the motor output properties of SPCC and powder core.

The content described above will be described in more details using properties comparison of an actual motor. FIG. 10 shows the structure of a claw pole type motor formed from cold-rolled steel plate (SPCC) of the prior art. This motor is formed by using a stator core that is formed by bending a steel plate such as SPCC and the like, and thus for small motors with a plate thickness φ of up to 100 mm for which bending is possible, the limit is a thickness of about 1.6 mm. Meanwhile, the stator core of this claw pole type motor is formed of a powder core of a density of 7.3 g/cm$^3$ which can be compacted in this configuration. The results of comparison of the output properties at this time, for a motor formed in the same configuration are shown in FIG. 12. The claw pole type motor formed of SPCC of the prior art under the current comparison condition which are residual magnetic flux density of the field magnet of 1.2 T, 24 poles, rotation speed of 1000 r/min, magnetomotive force of 220 ampere-turn, have a output torque that 10% higher compared to the motor that is formed of a powder core. The reason for this is, as shown in FIG. 11, when the direct current magnetizing properties of SPCC and powder core are compared, the magnetic permeability of the powder core is low, and the magnetic pole density when the same magnetic field is applied is higher for SPCC.

Figure 13:
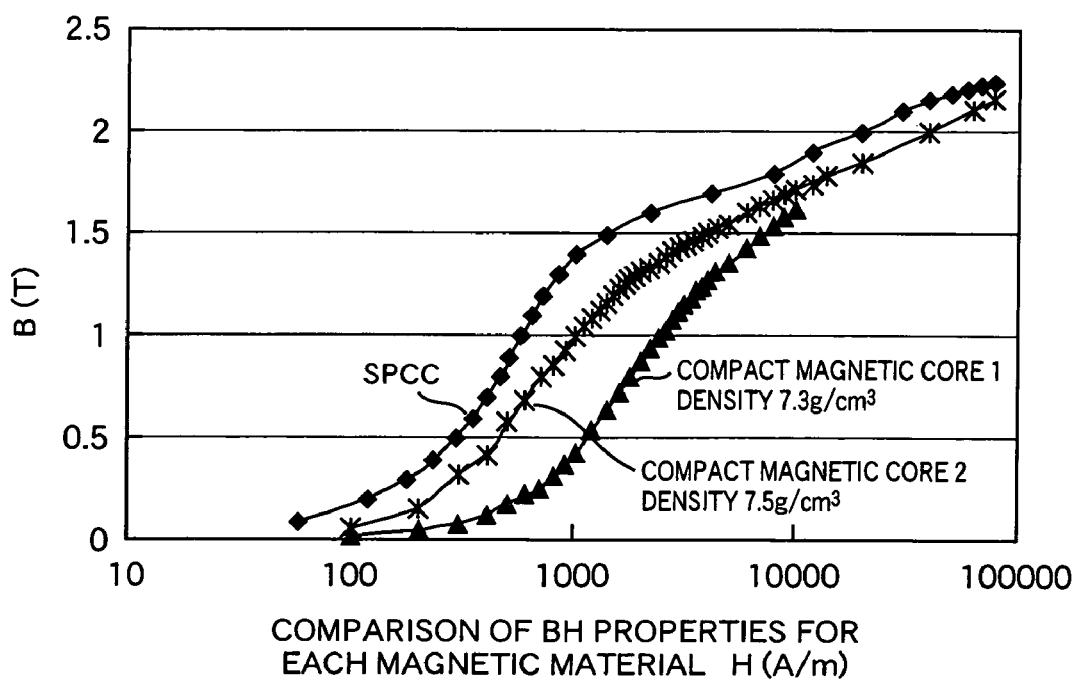
FIG. 13 is a comparative chart of the BH properties for each type of magnetic material.
Figure 14:
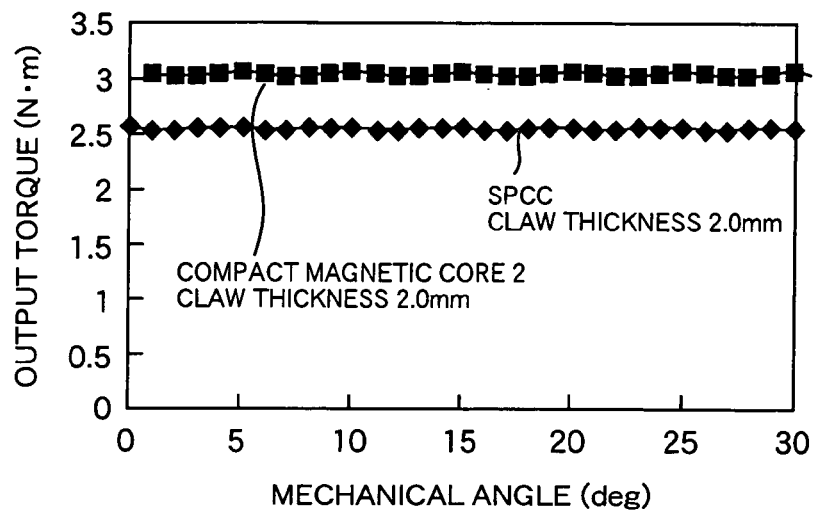
FIG. 14 is a results chart in which the output torque is computed for the claw pole type motor having a claw thickness of 2 mm using FEM.

However, there is no limit of the plate thickness of the powder core to 1.6 mm or less due to the difference in the processing method. Because of this, it is possible to obtain a claw pole type motor with optimal design by increasing the degree of freedom of design by making the claw magnetic pole thick and the like. The stator core which has been optimally designed under the conditions of the same field magnet aforementioned and the like has a claw thickness of 2 mm, and the compacting pressure at the time of compacting can be made high and thus formation using a high density powder core becomes possible. The direct current magnetizing properties of the highly powder core whose density is 7.5 g/cm$^3$ are shown in FIG. 13. The magnetic permeability is improved compared to the direct current magnetizing properties of the aforementioned 7.3 g/cm$^3$ powder core, but do not reach the magnetic properties of SPCC. The results of the calculations output torque are computed for the claw pole type motor having a claw thickness of 2 mm using FEM. Manufacturing problems are disregarded and in the calculations, the difference in output torque in the case where SPCC is used in the claw pole type motor and in the case where a powder core whose density is 7.5 g/cm$^3$ are compared. As shown in FIG. 14, the output torque in the case where the powder core is used is 20% higher. The reason for this is, in the magnetic properties, SPCC has higher magnetic permeability, but in SPCC, because eddy current generated on the inside of the metal plate is generated in the direction crossing this magnetic flux, this has the effect of contributing to reduction of the output torque. Due to this result, in a small motor of about φ100 mm, a permanent field magnet exceeding 1.2 T such as a rare earth sintered magnet having a high energy product is used as the field magnet, and the claw pole type motor that is designed such that the claw thickness of the stator core is 2 mm or more can relax the effect of saturation of magnetic flux from the field magnet, and because it becomes possible to increase the density of the powder core, it is clear that it is possible to realize high motor properties. It is to be noted that the output torque of the motor is strongly influenced by the magnetic flux that passes through the claw magnetic pole, and thus a claw magnetic pole whose density is at least 7.5 g/cm$^3$ or more is preferable.

Figure 15A:
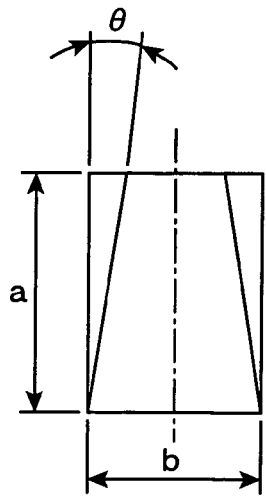
FIG. 15 is the taper angle and the surface area of the claw magnetic pole.
Figure 15B:
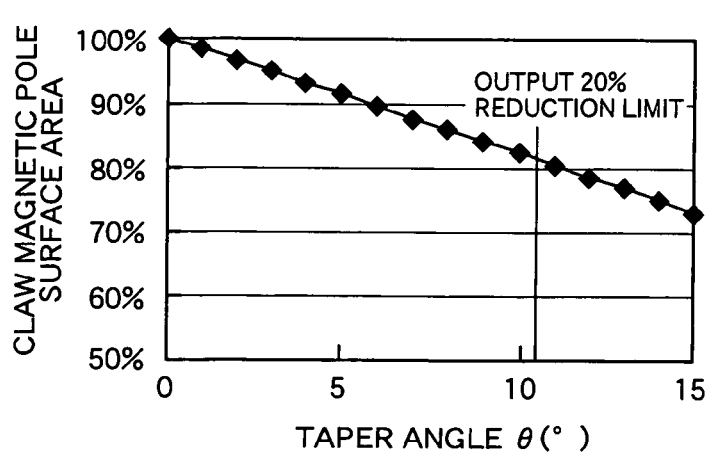
Figure 16:
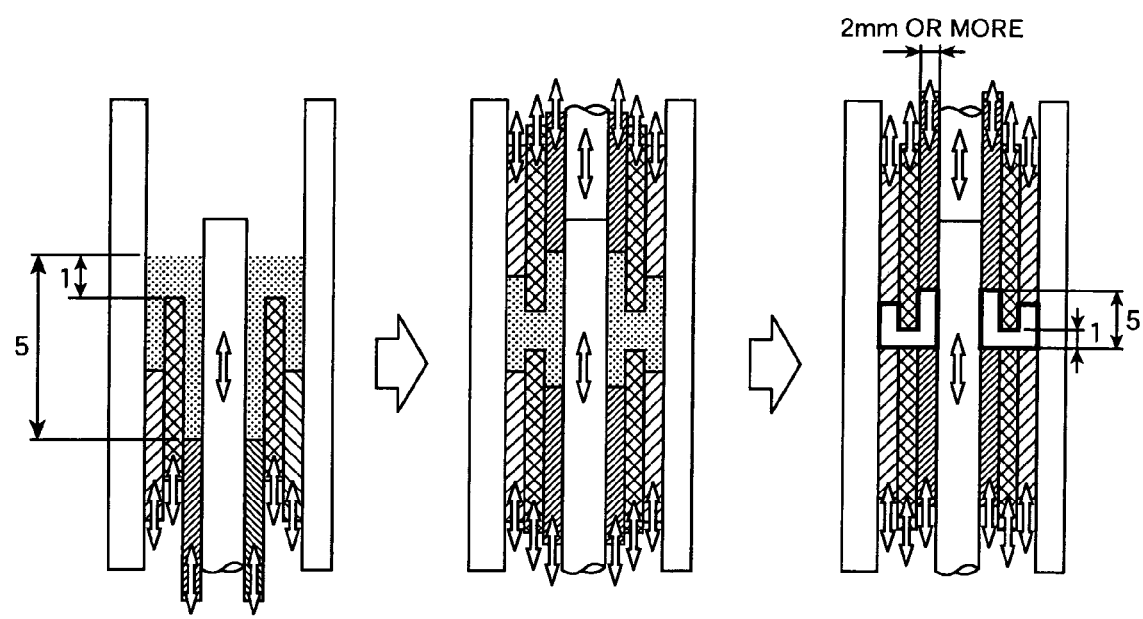
FIG. 16 is a schematic drawing showing the structure of the die for forming the stator core of the claw pole type motor of this invention.

Further, the results of studies about the ejection angle will be described. In order to form the stator core of a high density powder core, the aforementioned ejection taper is necessary, but when this taper angle is increased, the surface area of the claw magnetic pole becomes small, and the output torque is reduced. FIG. 15 shows the relationship between the taper angle and the claw magnetic pole surface area. As shown in (a), when the configuration of the claw is defined and given that the claw magnetic pole surface area is 100% when the taper angle is 0, the changes in the surface area due to the taper angle is $a \cdot b - a^2 \tan \theta$, and the relationship is that shown in (b). As shown before, when discussed in view of the compacting conditions of the powder core, the taper angle is preferably large, but in order to suppress motor output reduction is preferably small. As a result, the conditions for satisfying motor properties that are greater than equal to the properties for the motor formed of SPCC, require the taper angle to be up to 10° if output reduction of up to 20% is to be permitted.

Because it became possible to form the stator using a high density (high magnetic flux density) compact core, it is possible to set a high magnetomotive force using a magnet having a high residual magnetic flux density as the field magnet. A rare earth magnet is used as the permanent magnetic pole 5 of the rotor 3, and the magnetic flux density is made 1.2-1.4 tesla, and the dimensional relationship of the first claw core 11A and the second claw core 11B corresponding to this magnetic flux density was discovered by the following analysis.

Figure 7:
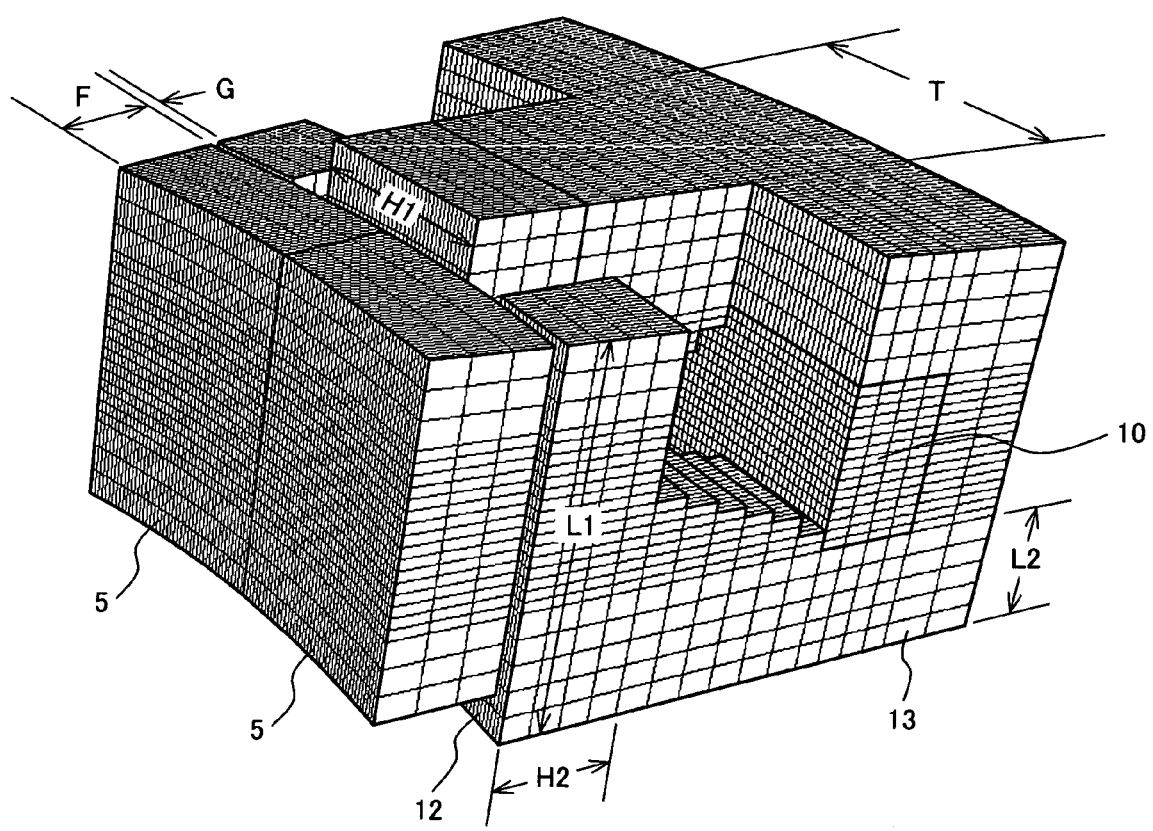
FIG. 7 is a mesh diagram for calculating the motor properties using a three-dimensional electromagnetic analysis.

FIG. 7 is a mesh diagram for the case of analyzing the motor properties using three-dimensional electromagnetic analysis, and the dimensions of each portion (circumferential direction average width angle T of the claw magnetic pole 12, axial direction dimension L1 of the claw magnetic pole 12, axial direction dimension L2 of the ring yoke portion 13, circumferential direction dimension H1 in the end extending in the axial direction 12T of the claw magnetic pole 12, the radial direction thickness H2 in the end extending in the axial direction 12T of the claw magnetic pole 12, the radial direction dimension F of the permanent magnetic pole 5, and the circumferential direction space G of the rotor 3 and the stator 6) are changed the parameters being studied are shown.

Figure 8:
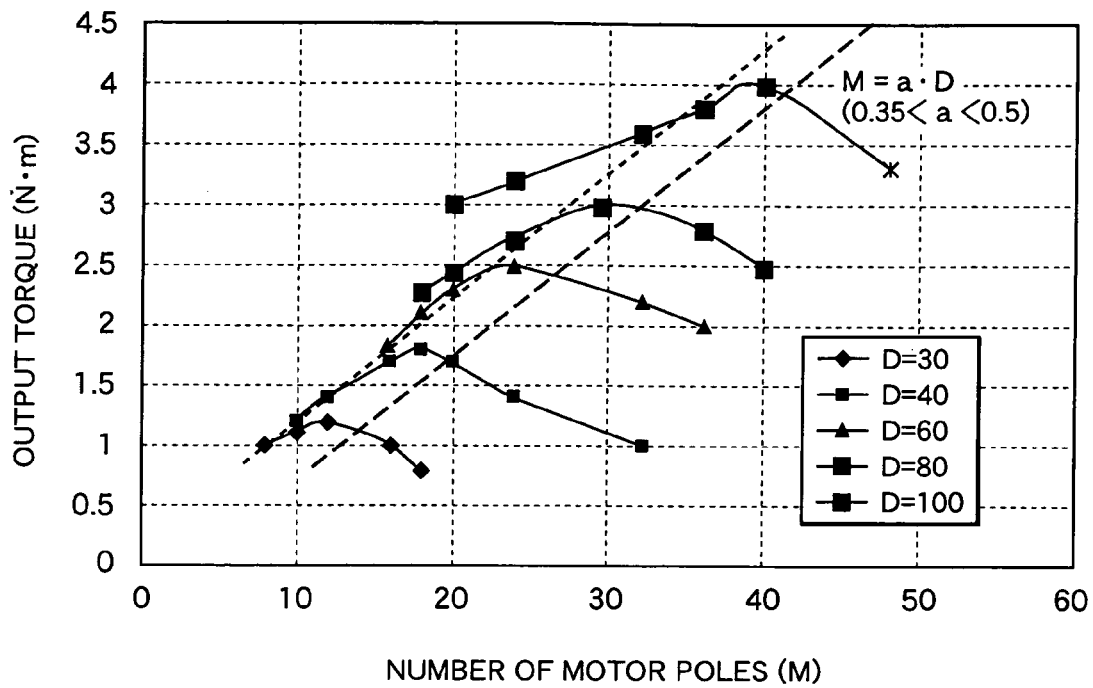
FIG. 8 is a chart showing the relationship between the number of poles of the claw pole type motor and the output torque.

FIG. 8 shows the results of computing the relationship between the number of poles M and the output torque (N·m) when the inner diameter D (FIG. 3) of the stator 6 is changed, in the case where the set conditions are such that the radial direction dimension (thickness) F of the permanent magnetic pole 5, the removal taper θ of the claw magnetic pole 12 is 8 degrees, the radial direction thickness H2 in the end extending in the axial direction 12T of the claw magnetic pole 12 is 2 mm, and the ratio of the axial direction dimension (length) L1 of the claw magnetic pole 12 and the axial direction dimension L2 of the ring yoke portion 13 is a maximum of 5. If the inner diameter D of the stator 6 is uniquely set under these limited conditions, it is evident that the output torque is the maximum in the specified number of poles M. The number of poles M shifts due to the inner diameter D of the stator 6, and the output torque is maximum when the relationship between the inner diameter D of the stator 6 and the number of poles M is M=a·D ($0.35 \leq a \leq 0.5$).

Next, a study is carried out of the average angle T in the circumferential direction of the claw magnetic pole 12 using an experimental motor with 24 poles and 32 poles as the number of poles M which has the maximum output torque. The computed results of the relationship between the circumferential direction average width angle of the claw magnetic pole 12, T (the circumferential direction average width angle in the axial direction middle of the claw magnetic pole for a ejection taper angle θ of 8 degrees, see FIG. 4) and the output torque are shown in FIG. 9.

Figure 4:
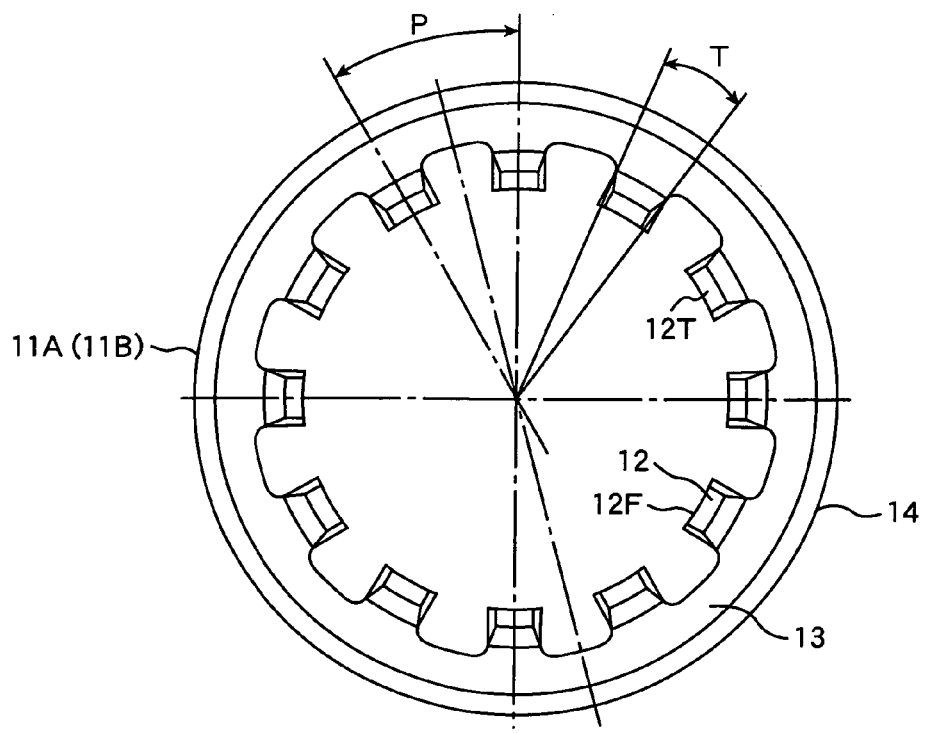
FIG. 4 is a front view of first claw core or the second claw core of FIG. 1.
Figure 5:
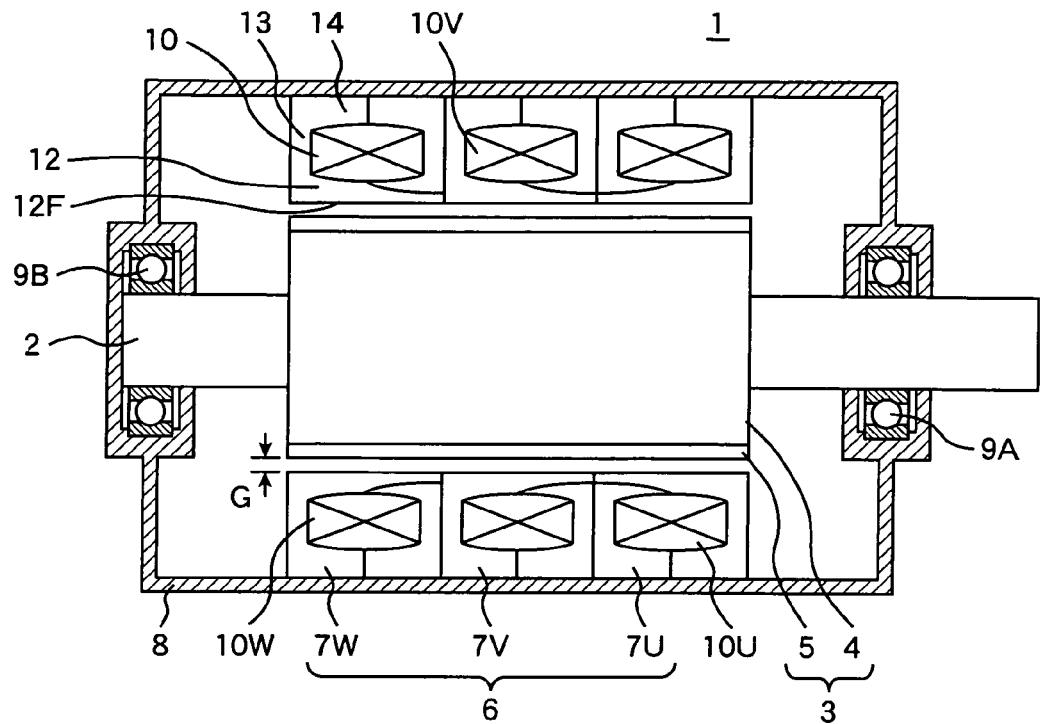
FIG. 5 is a vertical side surface view of claw pole type motor of the first embodiment of the claw pole type rotating electric machine according to this invention.
Figure 9:
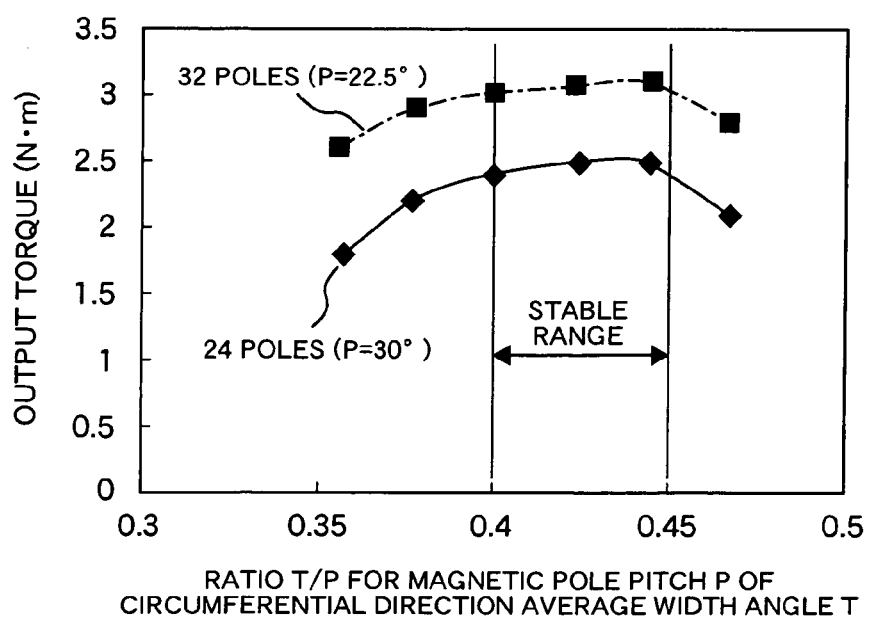
FIG. 9 is a chart showing the relationship between the average angle in the circumferential direction of the claw magnetic pole of the claw pole type motor and the output torque.

In FIG. 9, when the ratio of the circumferential direction average width angle of the claw magnetic pole 12, T for the magnetic pitch P corresponding to 1 cycle of AC on the horizontal axis is taken and the relationship with the output torque was looked at, it was determined that the output torque is maximum at substantially the same angle ratio for 24 poles and 32 poles. This can determine that in the case where the circumferential direction average width angle of the claw magnetic pole 12 is small, the magnetic flux of the field magnet side cannot sufficiently interlink with the ring coil 10, and conversely, in the case where it is too large, the leakage of magnetic flux onto the adjacent claw magnetic pole 12 becomes large and the output torque is reduced. In the case where the design of the claw magnetic pole can be done freely, it is thought that the output torque can be maximized under other conditions, but in the case where the aforementioned limitations are added to the claw magnetic pole 12, as shown in FIG. 4, the ratio of the circumferential direction average width angle of the claw magnetic pole 12, T for the magnetic pitch P corresponding to 1 cycle of AC in the range 0.4-0.45 is the design point that obtains the most stable output torque. It is to be noted that the results were the same for the number of poles other than 24 poles and 32 poles.

In the above embodiment, a claw pole type motor is described as the claw pole type rotating electric machine, but it is not limited to the claw pole type motor and may also be applied to a generator and the like.

What is claimed is:

1. A claw pole type rotating electric machine comprising:
a ring yoke portion;
first and second claw cores which are formed of a plurality of claw magnetic poles which are disposed at equal intervals on the circumference of the inner diameter side of the ring yoke portion and extend in the axial direction;
a stator core formed by meshing of the claw magnetic poles of the first and second claw cores with each other;
a stator formed by holding the ring coil on the outer circumference side of the claw magnetic poles in which the stator cores have been meshed; and
a rotor positioned via a space in the circumferential direction at the inner diameter side of the stator wherein:
the first and second claw cores are formed by compacting of magnetic powder;
the radial direction thickness of the claw magnetic pole is 2 mm or more;
a flat surface is formed perpendicular to the axial direction at the end extending in the axial direction of the claw magnetic pole;
at the claw magnetic pole, a ejection taper in the range of 10 degrees or less with respect to the axial direction is formed as a taper from the base to the end extending in the axial direction; and
the ratio of the axial direction length of the claw magnetic pole and the axial direction thickness of the ring yoke portion is no more than 5:1.

2. The claw pole type rotating electric machine described in claim 1, wherein given that the relationship between the absolute value M of the claw magnetic pole and the inner diameter D of the stator is M=a·D, the coefficient a is set to 0.35 or more and 0.5 or less.

3. The claw pole type rotating electric machine described in claim 2, wherein the ratio T/P of the circumferential direction average width angle T of the claw magnetic pole and the magnetic pole pitch P which corresponds to 1 cycle of AC is set to 0.4 or more and 0.45 or less.

4. The claw pole type rotating electric machine described in claim 1, wherein the ratio T/P of the circumferential direction average width angle T of the claw magnetic pole and the magnetic pole pitch P which corresponds to 1 cycle of AC is set to 0.4 or more and 0.45 or less.

5. The claw pole type rotating electric machine described in claim 1, wherein the claw core has a magnetic powder density of 7.5 g/cm$^3$ or more.

6. The claw pole type rotating electric machine described in claim 1, wherein the rotor comprises a rare earth metal permanent magnet.

7. The claw pole type rotating electric machine described in claim 1, wherein the rotor comprises a permanent magnetic pole whose residual magnetic flux density is 1.2-1.4 tesla.

* * * * *